(12) United States Patent
Seenivasan et al.

(10) Patent No.: US 11,792,089 B2
(45) Date of Patent: Oct. 17, 2023

(54) METHOD AND SYSTEM FOR MONITORING APPLICATION SERVICES IN A NETWORK

(71) Applicant: Samsung Electronics Co., Ltd., Suwon-si (KR)

(72) Inventors: Varadarajan Seenivasan, Bangalore (IN); Sapan Pramod Kumar Shah, Bangalore (IN); Basavaraj Jayawant Pattan, Bangalore (IN); Narendranath Durga Tangudu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/718,206

(22) Filed: Apr. 11, 2022

(65) Prior Publication Data
US 2022/0360503 A1    Nov. 10, 2022

(30) Foreign Application Priority Data

Apr. 9, 2021   (IN) .............................. 202141016803
Mar. 28, 2022  (IN) .............................. 202141016803

(51) Int. Cl.
H04L 41/50    (2022.01)

(52) U.S. Cl.
CPC ............................... H04L 41/5032 (2013.01)

(58) Field of Classification Search
CPC ................................................. H04L 41/5032
USPC ....................................................... 709/224
See application file for complete search history.

(56) References Cited

U.S. PATENT DOCUMENTS

| 7,590,736 B2 * | 9/2009 | Hydrie ................ H04L 67/1001 709/229 |
| 7,904,909 B1 * | 3/2011 | Reiner .................. G06F 9/5061 709/224 |
| 8,285,827 B1 * | 10/2012 | Reiner ...................... G06F 9/50 703/21 |

(Continued)

FOREIGN PATENT DOCUMENTS

| CN | 111737085 A | * 10/2020 | .......... G06F 11/3006 |
| CN | 112363887 A | * 2/2021 | |

(Continued)

OTHER PUBLICATIONS

Samsung, "Pseudo-CR on SEAL signalling control plane", 3GPP TSG-SA WG6 Meeting #29, Feb. 25-Mar. 1, 2019, S6-190526, 11 pages.

(Continued)

*Primary Examiner* — Melvin H Pollack

(57) ABSTRACT

The present disclosure relates to method and a system for monitoring application services in network. The system comprises ASM client and ASM server. The ASM client is configured in UE to monitor parameters related to applications in UE. The ASM server monitors VAL server based on parameters associated with VAL server. The ASM server obtain status information of VAL server by performing either pull procedure, push procedure, and subscribe-notify procedure. Further, the ASM server provides the status information to one or more entities for performing one or more actions. Thus, the present disclosure facilitates the system to monitor the application services and indicate one or more entities to perform corrective actions to provide seamless and uninterrupted services to users.

20 Claims, 12 Drawing Sheets

(56) References Cited

U.S. PATENT DOCUMENTS

| | | | | |
|---|---|---|---|---|
| 8,489,728 | B2* | 7/2013 | Vinberg | H04L 41/0631 709/224 |
| 9,787,537 | B2 | 10/2017 | Zhu et al. | |
| 10,728,117 | B1* | 7/2020 | Sharma | H04L 41/5067 |
| 11,172,019 | B1* | 11/2021 | Zhao | H04L 67/125 |
| 11,194,689 | B2* | 12/2021 | Buffone | G06F 11/34 |
| 11,403,091 | B1* | 8/2022 | Morris | H04L 12/18 |
| 11,451,460 | B1* | 9/2022 | Haislip | H04M 15/8033 |
| 11,575,617 | B2* | 2/2023 | Ainäs | H04L 47/82 |
| 2008/0175357 | A1* | 7/2008 | Tucker | H04L 67/56 379/93.01 |
| 2013/0111479 | A1* | 5/2013 | Chen | G06F 11/3433 718/100 |
| 2014/0310564 | A1* | 10/2014 | Mallige | G06F 11/0751 714/47.1 |
| 2015/0193294 | A1* | 7/2015 | Hladik, Jr. | H04L 41/00 714/47.3 |
| 2015/0295808 | A1* | 10/2015 | O'Malley | H04L 43/10 709/224 |
| 2017/0310605 | A1* | 10/2017 | Garcia | H04L 47/76 |
| 2018/0159954 | A1* | 6/2018 | Lu | H04L 67/63 |
| 2018/0332115 | A1* | 11/2018 | Mase | H04L 67/566 |
| 2019/0065470 | A1* | 2/2019 | Matthews | G06F 40/30 |
| 2019/0141006 | A1* | 5/2019 | Schnitt | G06F 9/44505 |
| 2019/0149435 | A1* | 5/2019 | Tapia | H04L 43/04 709/224 |
| 2020/0065085 | A1* | 2/2020 | Talbert | G06F 8/65 |
| 2020/0177473 | A1* | 6/2020 | Xu | H04L 43/0894 |
| 2020/0178052 | A1 | 6/2020 | Pattan et al. | |
| 2020/0210261 | A1* | 7/2020 | Reddy | H04L 41/0816 |
| 2020/0245168 | A1* | 7/2020 | Ketonen | H04L 43/55 |
| 2020/0287800 | A1* | 9/2020 | Xu | H04W 48/18 |
| 2020/0287802 | A1* | 9/2020 | Singh | H04L 41/046 |
| 2020/0366572 | A1* | 11/2020 | Chauhan | H04L 41/5009 |
| 2021/0112443 | A1* | 4/2021 | Krishan | H04W 28/0842 |
| 2021/0182165 | A1* | 6/2021 | Kammath | G06F 11/3466 |
| 2021/0211889 | A1* | 7/2021 | Buddhikot | H04W 72/0453 |
| 2021/0218571 | A1* | 7/2021 | Ansari | H04M 15/705 |
| 2021/0235316 | A1* | 7/2021 | Huang | H04W 40/36 |
| 2021/0374029 | A1* | 12/2021 | Purushothaman | G06F 11/3409 |
| 2022/0053476 | A1* | 2/2022 | Aksu | H04W 28/0268 |
| 2022/0078133 | A1* | 3/2022 | Trang | H04L 47/762 |
| 2022/0078806 | A1* | 3/2022 | Sevindik | H04W 72/12 |
| 2022/0188211 | A1* | 6/2022 | Gupta | G06F 9/5083 |
| 2022/0197773 | A1* | 6/2022 | Butler | H04N 21/234 |
| 2022/0201443 | A1* | 6/2022 | El Essaili | H04W 4/44 |
| 2022/0237102 | A1* | 7/2022 | Bugdayci | G06F 11/3495 |
| 2022/0300313 | A1* | 9/2022 | Iyer | G06F 9/45558 |
| 2022/0311652 | A1* | 9/2022 | Zhang | H04L 41/046 |
| 2022/0329995 | A1* | 10/2022 | Venkata | H04L 41/0879 |
| 2022/0353732 | A1* | 11/2022 | Filippou | H04W 28/0284 |

FOREIGN PATENT DOCUMENTS

| | | | | |
|---|---|---|---|---|
| EP | 3974992 | A1 * | 3/2022 | |
| JP | 7100180 | B2 * | 7/2022 | G06F 11/2221 |
| KR | 10-2015-0113151 | A | 10/2015 | |
| WO | 2014/052381 | A1 | 4/2014 | |
| WO | 2021/001272 | A1 | 1/2021 | |
| WO | WO-2022253417 | A1 * | 12/2022 | |

OTHER PUBLICATIONS

International Search Report dated Aug. 3, 2022 in connection with International Patent Application No. PCT/KR2022/005228, 3 pages.

Written Opinion of the International Searching Authority dated Aug. 3, 2022 in connection with International Patent Application No. PCT/KR2022/005228, 4 pages.

3GPP TS 22.101 V18.3.0 (Dec. 2021), Technical Specification, 3rd Generation Partnership Project; Technical Specification Group Services and System Aspects; Service aspects; Service principles (Release 18), Dec. 2021, 103 pages.

3GPP TS 23.501 V17.4.0 (Mar. 2022), Technical Specification, 3rd Generation Partnership Project; Technical Specification Group Services and System Aspects; System architecture for the 5G System (5GS); Stage 2 (Release 17), Mar. 2022, 567 pages.

3GPP TR 23.700-97 V0.5.0 (Mar. 2022), Technical Report, 3rd Generation Partnership Project; Technical Specification Group Services and System Aspects; Study on Application Capability Exposure for IoT Platforms; (Release 18), Mar. 2022, 26 pages.

Samsung, "Pseudo-CR on solution for KI#2—Application server monitoring and control of traffic," S6-212476 (Revision of S6-212450, S6-212300), 3GPP TSG-SA WG6 Meeting #45-bis-e, e-meeting, Oct. 11-19, 2021, 5 pages.

Samsung, et al., "Updates to Location based Group," S6-212152 (revision of S6-212109, S6-211989, S6-211839), 3GPP TSG-SA WG6 Meeting #45, e-meeting, Aug. 25-Sep. 3, 2021, 7 pages.

* cited by examiner

METHOD AND SYSTEM FOR MONITORING APPLICATION SERVICES IN A NETWORK

CROSS-REFERENCE TO RELATED APPLICATIONS

This application is based on and claims priority under 35 U.S.C. § 119 to Indian Patent Application No. 202141016803, filed Apr. 9, 2021, and to Indian Patent Application No. 202141016803, filed Mar. 28, 2022, in the Indian Intellectual Property Office, the disclosures of which are incorporated by reference herein in their entirety.

BACKGROUND

1. Field

The present subject matter is generally related to the field of wireless network, more particularly, but not exclusively to a method and system for monitoring application services in a wireless network.

2. Description of Related Art

Applications are means through which service providers engage with devices and users to provide services related to the applications. The applications may be a vertical application software which is business specific and designed for specific domain. The vertical applications may be smart home applications, social media applications, health care applications, financial service applications and the like. The services provided by the service providers may include providing IT solutions, services to the users, organizations, and the like. Monitoring both application services and underlying networks is required to ensure that the users receive seamless and uninterrupted services. Monitoring the application services provide information on aspects such as, service availability and situations when the devices are not able to connect to the application servers due to one or more faults (e.g., connection failure, application failure, hardware failure) or network congestion. One of the important aspects is to monitor the application services and networks to provide continuous service and prevent outage.

Over next few years, number of IoT connections is set to surge as there are many applications where Internet of Things (IoT) devices are used to provide services to the users. The increase in the number of devices means monitoring every application and every device connected to the network, which would be very difficult. Further, as per 3rd generation partnership project (3GPP), operators are required to control traffic from a user equipment (UEs) to an application on a third-party server or control traffic from the UEs to the third-party server. When an application on a third-party server or the third-party server itself becomes congested or fails, the traffic towards that server need to be controlled to avoid/mitigate issues caused by unproductive use of the 3GPP network resources. Currently exiting systems do not configure the 3GPP network as per requirement of the third-party application servers for monitoring the applications.

The information disclosed in this background of the disclosure section is only for enhancement of understanding of the general background of the present disclosure and should not be taken as an acknowledgement or any form of suggestion that this information forms the prior art already known to a person skilled in the art.

SUMMARY

In an embodiment, the present disclosure relates to a method for monitoring application services in a network. The method steps are performed by an application service management (ASM) server. The method includes transmitting a configuration request to a vertical application layer (VAL) server. The configuration request comprises one or more parameters associated with the VAL server. Upon transmitting, the method includes monitoring application services provided by the VAL server by obtaining status information of the VAL server based on the one or more parameters. Further, the monitoring is performed using at least one of a pull procedure, a push procedure, and a subscribe-notify procedure.

In an embodiment, the present disclosure relates to a method for monitoring application services in a network. The method steps are performed by a VAL server. The method includes receiving a configuration request from an ASM server. The configuration request comprises one or more parameters associated with the VAL server. Upon receiving, the method includes providing status information to the ASM server for monitoring application services provided by the VAL server based on the one or more parameters. The monitoring is performed using at least one of a pull procedure, a push procedure, and a subscribe-notify procedure.

In an embodiment, the present disclosure relates to a method for monitoring application services in a distributed network. The method steps are performed by a first ASM server in the distributed network. The method includes transmitting a configuration request to a VAL server via a second ASM server. The configuration request comprises one or more parameters associated with the VAL server. Upon transmitting, the method includes monitoring application services provided by the VAL server by obtaining status information of the VAL server via the second ASM server based on the one or more parameters. Further, the monitoring is performed using at least one of a pull procedure, a push procedure, and a subscribe-notify procedure.

In an embodiment, the present disclosure relates to a system for monitoring application services in a network. The system comprises an ASM client and an ASM server. The ASM client is configured in a UE to monitor one or more parameters related to an application in the UE. The ASM server is configured for monitoring the VAL server based on one or more parameters associated with the VAL server. The ASM server obtains the status information of the VAL server by performing at least one of a pull procedure, a push procedure, and a subscribe-notify procedure. Further, the ASM server provides the status information of the VAL server to one or more entities for performing one or more actions.

The foregoing summary is illustrative only and is not intended to be in any way limiting. In addition to the illustrative aspects, embodiments, and features described above, further aspects, embodiments, and features will become apparent by reference to the drawings and the following detailed description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
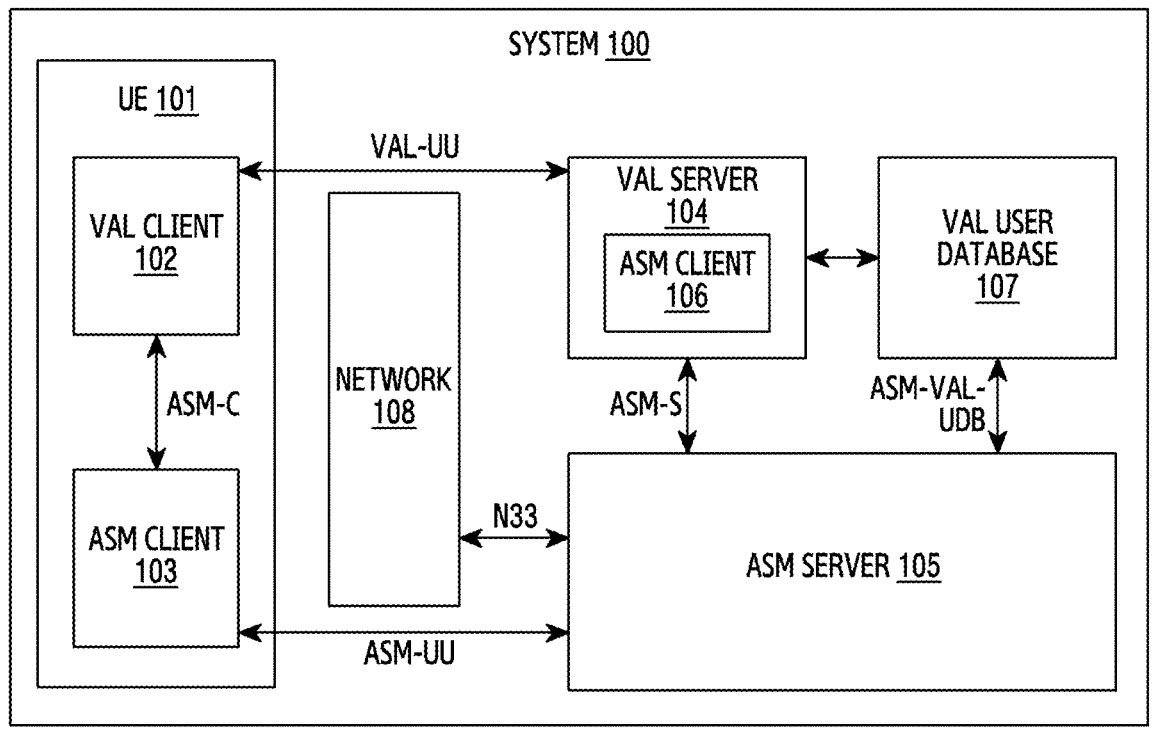
FIG. 1 illustrates an exemplary architecture for monitoring application services in a network in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the present document, the word "exemplary" is used herein to mean "serving as an example, instance, or illustration." Any embodiment or example of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprise," "comprising," or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "include," "including," or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to a method and a system for monitoring application services in a network. Generally, monitoring application services and underlying networks is required to ensure that a user receives seamless and uninterrupted services. Due to absence of specific framework for monitoring the application services and the underlying network, it is currently difficult to monitor the application services efficiently. Therefore, the present disclosure discloses the system which includes an ASM server for monitoring the application services provided by a VAL server. The ASM server may be configured to obtains status information of the VAL server by performing either a pull procedure, a push procedure, and a subscribe-notify procedure. Thereafter, the ASM server provides the status information to entities such as a service provider, a UE, and a network to perform one or more corrective actions. Thus, the present disclosure is able to monitor the application services provided by the VAL server and provide uninterrupted service to the user.

FIG. 1 shows a system 100 for monitoring application services in a network. The system 100 includes a UE 101, a VAL server 104, an ASM server 105, a VAL user database 107 and a network 108. The UE 101 includes a VAL client 102, and an ASM client 103. The UE 101 may include, but not limited to, mobile phone, a tablet, a smart phone, a laptop computer, a desktop computer, a personal computer (PC), a notebook, and the like. The VAL client 102 refers to a vertical application client residing in the UE 101. The VAL client 102 utilizes the ASM client 103 to receive status information of the VAL server 104 in order to control application specific traffic. The ASM client 103 is configured in the UE 101 to monitor one or more parameters related to the applications in the UE 101.

The applications may include, but is not limited to, smart home application, commercial management application, traffic management application, health care application, finance service application, and the like. The one or more parameters related to the applications may include, but is not limited to, memory usage, signal strength, and the like. A person skilled in the art may understand that the one or more parameters may depend on the type of application. The ASM client 103 interacts with the VAL client 102 via an ASM-C interface. The VAL server 104 refers to a vertical application server, which provides application services to the VAL client 102. In an embodiment, an ASM client 106 may be configured in the VAL server 104 to obtain the status information of the VAL server 104. The VAL server 104 is configured for monitoring the one or more parameters associated with the VAL server.

The one or more parameters associated with the VAL server 105 may include, but is not limited to, a slice type, quality of service (QoS) of the VAL server, a list of VAL users with subscription status, priority of the VAL users, throttle percentage for the VAL server response time, VAL server uptime, VAL server availability status, throughput level, and congestion status. The ASM server 105 obtains the status information of the VAL server 104 by performing at least one of a pull procedure, a push procedure, and a subscribe-notify procedure, which are explained in subsequent figures of the present description. The ASM server 105 provides the status information of the VAL server 104 to one or more entities for performing one or more actions. The one or more entities may include, but is not limited to, the UE 101, the network 108, and a VAL service provider.

The status information of the VAL server 104 may include, but is not limited to, average request queue length, average processing time, central processing unit (CPU) usage, memory usage, VAL server traffic, congestion status, average server response time, VAL server uptime, VAL server availability status, throughput level, and congestion status. The one or more actions may include, but is not limited to, stopping the VAL client 102 for a certain period of time to overcome any network congestion, adjusting network resources to provide services efficiently, and the like. The ASM server 105 communicates with the ASM client 103 via ASM-UU interface to provide the status information of the VAL server 104. The ASM server 105 communicates with the network 108 via interface N33 to provide the status information of the VAL server 104. The N33 is a reference point in 5G network via which the ASM server 105 communicates to network exposure function (NEF) for controlling application traffic in the network 108. Further, the ASM server 105 communicates with the VAL server 104 via an ASM-S interface to obtain the status information of the VAL sever 104.

Further, the ASM server 105 may communicate with the VAL user database 107 via ASM-VAL-UDB interface to obtain user profile of the VAL server 104, user configuration of the VAL server 104, VAL application server configuration and communication profile which is stored in the VAL user database 107. In another example, the ASM server 105 may obtain the status information of the VAL server 104 when the VAL server 104 is deployed in a distributed network. The distributed network is a network system over which computer programming, software, and data are spread out across in more than one computer and communicate complex messages through nodes and are dependent upon each other. The distributed network may include a plurality of ASM servers.

For instance, a first ASM server from the plurality of ASM servers may communicate with a second ASM server in the distributed network to obtain the status information of the VAL server 104. The first ASM server may monitor the VAL server 104 via the second ASM server based on the one or more parameters associated with the VAL server 104. The first ASM server obtains the status information of the VAL server 104 via the second ASM server by performing either the pull procedure, the push procedure, and the subscribe-notify procedure.

In an embodiment, the status information of the VAL server 104 may be provided by the ASM client 106 to the second ASM server in the distributed network by performing either the pull procedure, the push procedure, and the subscribe-notify procedure. Further, the first ASM server provides the status information of the VAL server 104 obtained via the second ASM server to the one or more entities for performing the one or more actions.

Figure 3A:
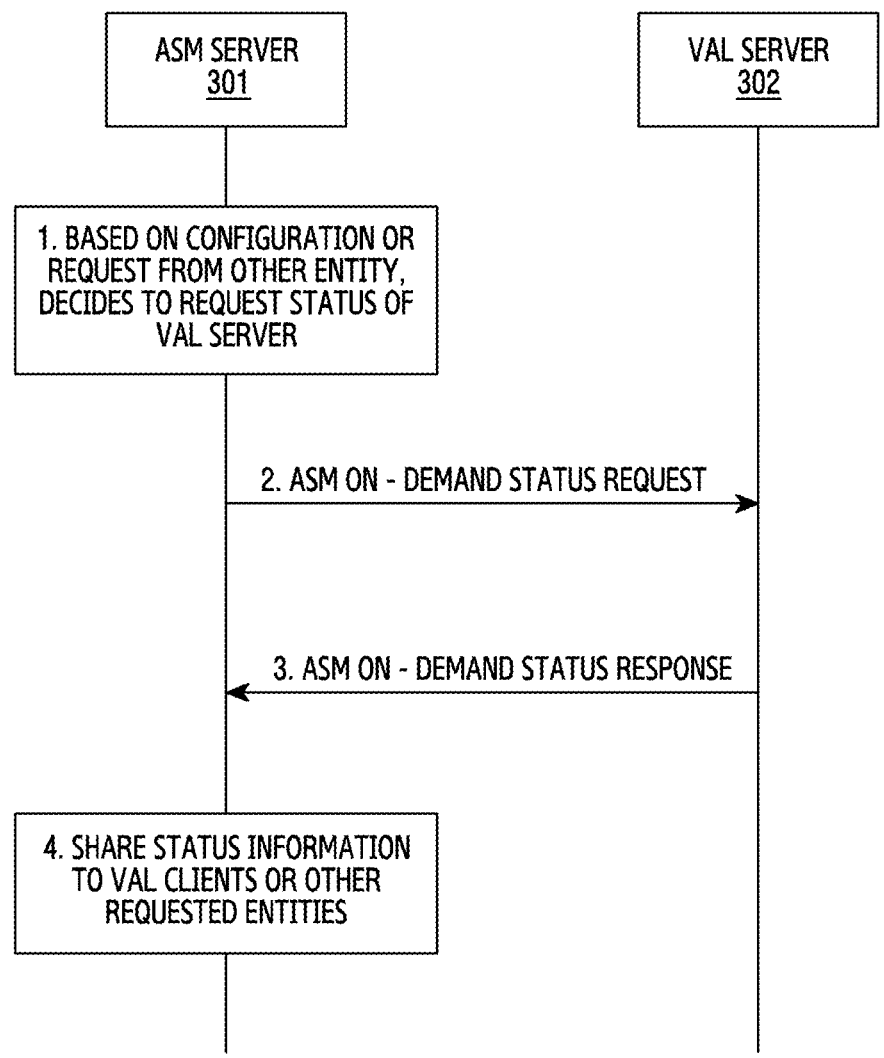
FIG. 3A illustrates a sequence diagram for obtaining status information of a VAL server using pull procedure in accordance with some embodiments of present disclosure.
Figure 3B:
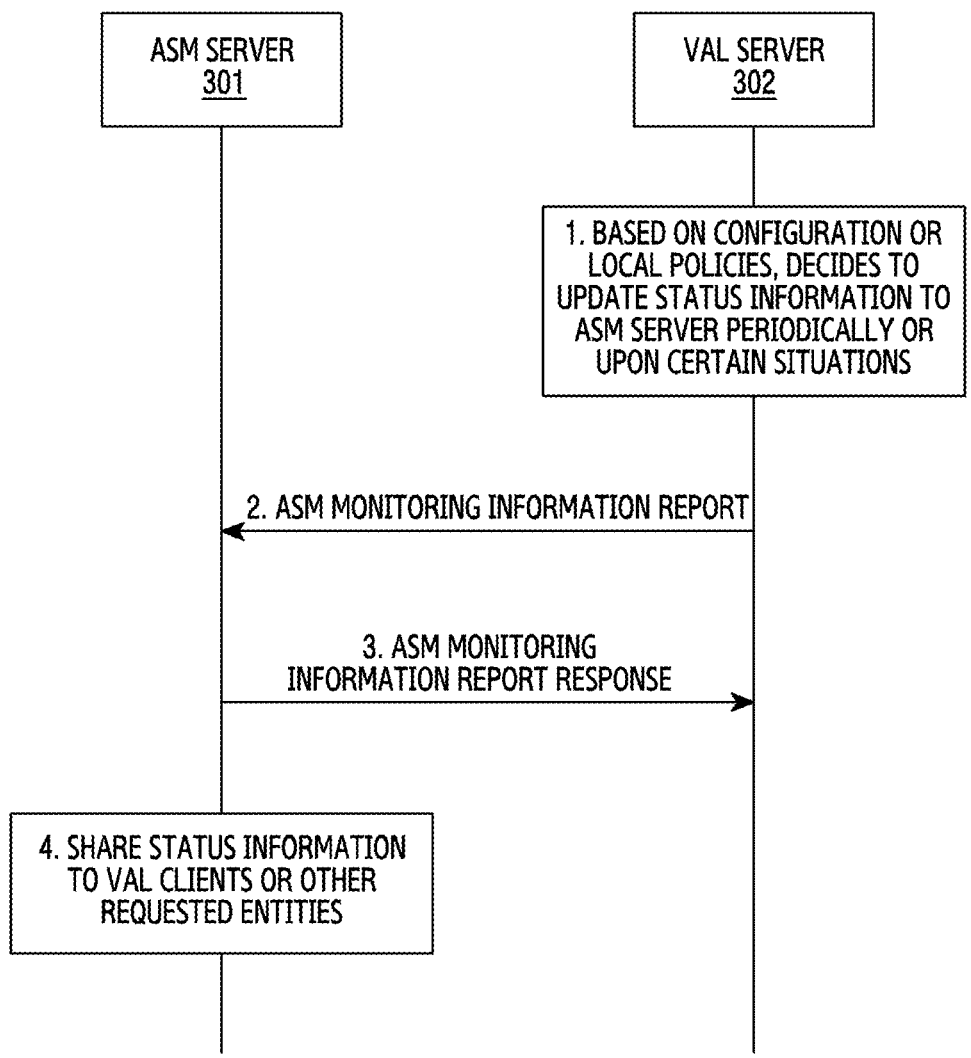
FIG. 3B illustrates a sequence diagram for obtaining status information of a VAL server using push procedure in accordance with some embodiments of present disclosure.
Figure 3C:
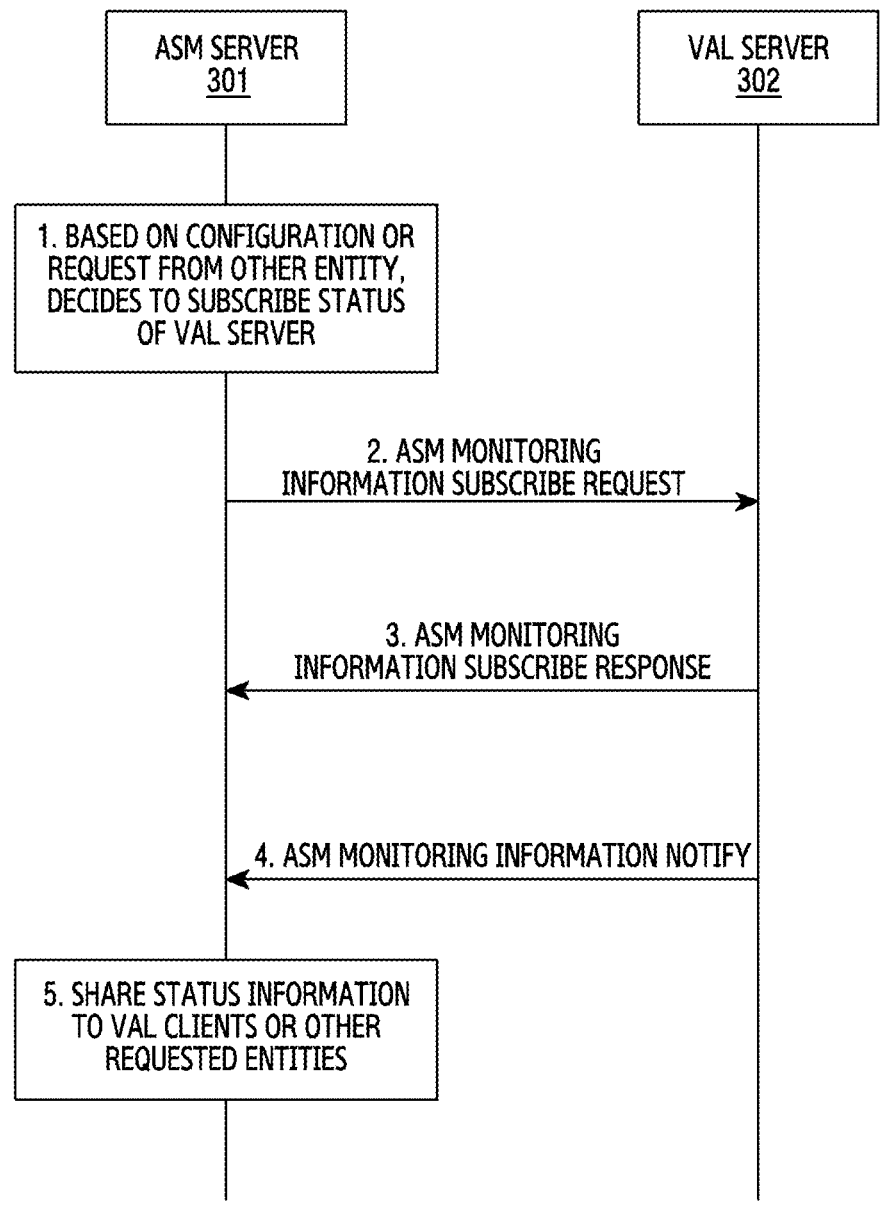
FIG. 3C illustrates a sequence diagram for obtaining status information of a VAL server using subscribe-notify procedure in accordance with some embodiments of present disclosure.
Figure 3D:
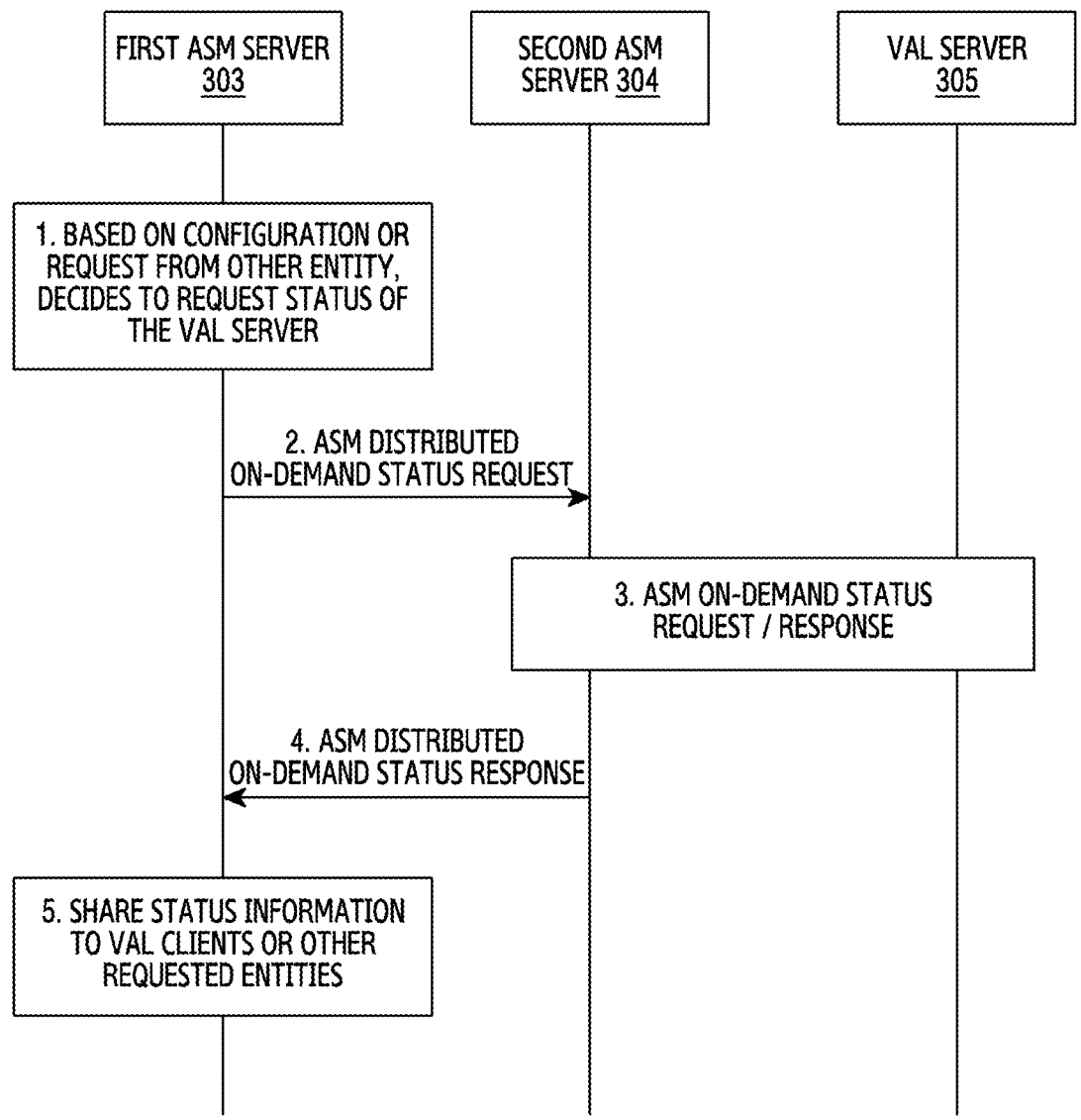
FIG. 3D illustrates sequence diagram for obtaining status information of a VAL server in a distributed network, in accordance with some embodiments of present disclosure.

FIG. 3D illustrates a sequence diagram for obtaining status information of the VAL server in the distributed network using the pull procedure. FIG. 3D includes a first ASM server 303, a second ASM server 304 and a VAL server 305. It is understood that FIG. 3D is an exemplary sequence diagram with two ASM servers in the distributed network and the distributed network may include multiple ASM servers (which is not shown in FIG. 3D). As shown, at step 1, the first ASM server 303 decides to request status of the VAL server 305 based on configuration or request from other entity. The first ASM server 303 decides to obtain the status information of the VAL server 305 via the second ASM server 304 based on either the configuration, presence of the VAL server 305 in the distributed network or a request from the one or more entities such as, the UE 101, the network 108, and the VAL service provider. At step 2, the first ASM server 303 transmits the status request to the second ASM server 304.

The second ASM server 304 receives the status request from the first ASM server 303 to obtain the status information of the VAL sever 305. At step 3, ASM on-demand status request/response are exchanged between the second ASM server 304 and the VAL server 305. The second ASM server 304 transmits the status request to the VAL server 305 to obtain the status information. The VAL server 305 receives the status request from the second ASM server 304. The VAL server 305 transmits the status information to the second ASM server 304. Further, the second ASM server 304 receives the status information from the VAL server 305 in response to the status request. At step 4, the second ASM server 304 transmits the status information of the VAL server 305 to the first ASM server 303 in response to the on-demand status request.

The first ASM server 303 receives the status information of the VAL server 305 via the second ASM server 304 in response to the status request. Upon receiving, at step 5, the first ASM server 303 provides the status information of the VAL server 305 to the one or more entities to perform the one or more actions. In an embodiment, the first ASM server 303 may send subscribe request to the VAL server 305 via the second ASM server 304. In an embodiment, the VAL server 305 may push the status information to the first ASM server 303 via the second ASM server 304.

Figure 2A:
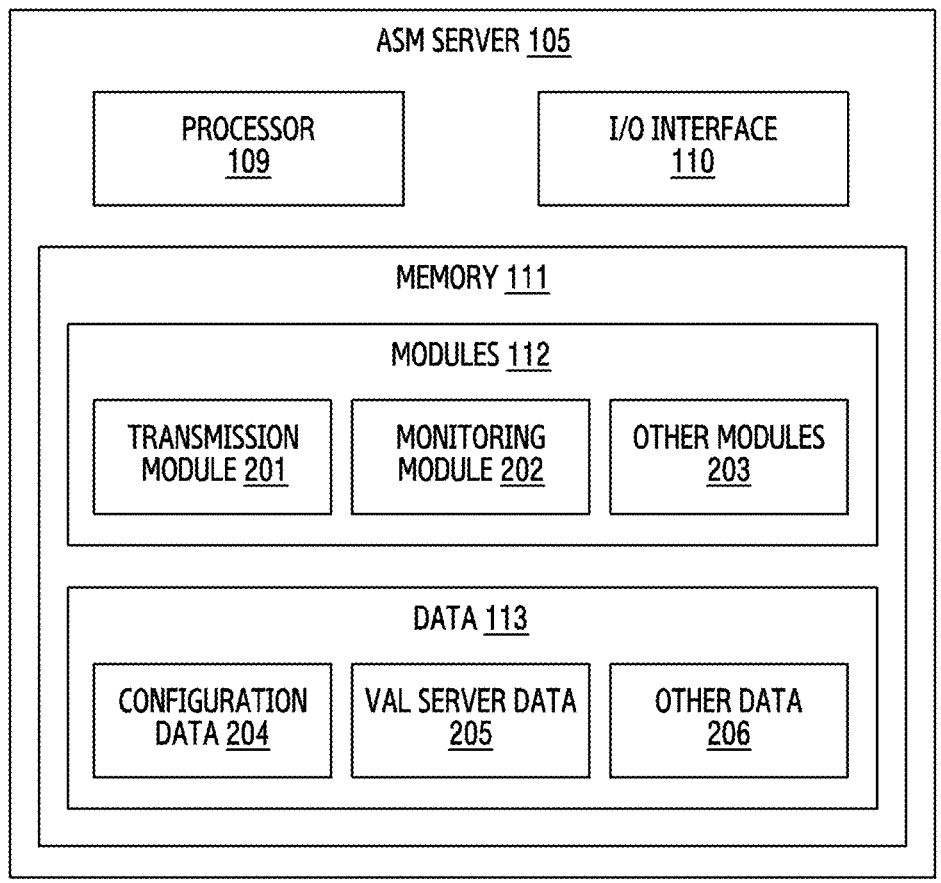
FIG. 2A illustrates a detailed block diagram of an ASM server for monitoring application services in a network in accordance with some embodiments of the present disclosure.

FIG. 2A illustrates a detailed block diagram of an ASM server for monitoring application services in a network in accordance with some embodiments of the present disclosure.

Data 113 and one or more modules 112 in the memory 111 of the ASM server 105 is described herein in detail.

In one example, the one or more modules 112 may include, but are not limited to, a transmission module 201, a monitoring module 202, and one or more other modules 203.

In an embodiment, the data 113 in the memory 111 may include configuration data 204, VAL server data 205, and other data 206 associated with the ASM server 105.

In an embodiment, the data 113 in the memory 111 may be processed by the one or more modules 112 of the ASM server 105. In an embodiment, the one or more modules 112 may be implemented as dedicated units and when implemented in such a manner, said modules may be configured with the functionality defined in the present disclosure to result in a novel hardware. As used herein, the term module may refer to an application specific integrated circuit (ASIC), an electronic circuit, a field-programmable gate arrays (FPGA), programmable system-on-chip (PSoC), a combinational logic circuit, and/or other suitable components that provide the described functionality.

One or more modules 112 of the ASM server 105 along with the data 113 functions to monitor application services in the network using the ASM server 105.

The configuration data 204 comprises details about one or more parameters to be monitored for the VAL server 104. The one or more parameters may include, but not limited to, slice type, QoS of the VAL server, list of VAL users with subscription status, priority of the VAL users, throttle percentage for the VAL server response time, VAL server uptime, VAL server availability status, throughput level, and congestion status.

The VAL server data 205 comprises the status information of the VAL server 104. The status information includes, but not limited to, average request queue length, average processing time, CPU usage, memory usage, VAL server traffic, congestion status, average server response time, VAL server uptime, VAL server availability status, throughput level, and congestion status.

The other data 206 may store data, including temporary data and temporary files, generated by modules for performing the various functions of the ASM server 105.

The transmission module 201 may transmit the configuration request to the VAL server 104. The configuration request includes the one or more parameters associated with the VAL server 104. Upon transmitting, the monitoring module 202 may monitor the application services provided by the VAL server 104 by obtaining status information of the VAL server 104 based on the one or more parameters. The monitoring is performed using either the pull procedure, the push procedure, and the subscribe-notify procedure. In an embodiment, the status information of the VAL server 104 may be provided directly by the VAL server 104 to the ASM server 105 by performing either the pull procedure, the push procedure, and the subscribe-notify procedure. In another embodiment, the status information of the VAL server 104 may be provided by the ASM client 106 to the ASM server 105 by performing either the pull procedure, the push procedure, and the subscribe-notify procedure.

FIG. 3A illustrates a sequence diagram for obtaining status information of a VAL server using pull procedure in accordance with some embodiments of present disclosure. As shown, FIG. 3A includes an ASM server 301 and a VAL server 302. At step 1, the ASM server 301 decides to request status of the VAL server 302 based on configuration or request from other entity. The ASM server 301 transmit a status request to the VAL server 302 to obtain the status information of the VAL server 302 based on either the configuration or a request from one or more entities. The one or more entities may include, but is not limited to, the UE 101, the network 108, and the VAL service provider, and the like. At step 2, the ASM server 301 transmits the on-demand status request to the VAL server 302. In the pull procedure, the one or more entities may demand to obtain the status information of the VAL server 302.

For example, the on-demand request may be that the VAL service provider requires current status of the VAL server 302 to provide better services to customers. The VAL server 302 receives the status request from the ASM server 301. At step 3, the VAL server 302 transmits the status information to the ASM server 301 in response to the on-demand status request. The ASM server 301 receives the status information of the VAL server 302 in response to the status request. At step 4, the ASM server 301 provides the status information of the VAL server 302 to the one or more entities to perform one or more actions. The one or more actions may depend on the status information of the VAL server 302.

For example, consider the status information of the VAL server 104 is provided to the ASM client 103 of the UE 101 to perform corrective actions. In such a case, if the status information of the VAL server 302 indicates that the network 108 is congested, then the ASM client 103 of the UE 101 may inform the VAL client 102 to stop the services for a predefined time period. For example, say to stop the services for half an hour to overcome the congestion at the network 108.

Likewise, FIG. 3B illustrates a sequence diagram for obtaining status information of a VAL server using push procedure in accordance with some embodiments of present disclosure. As shown, FIG. 3B includes the ASM server 301 and the VAL server 302. In the push procedure, at step 1, the VAL server 302 decides to update status information to the ASM server 301 based on configuration or local policies periodically or upon certain situations. The VAL server 302 decides to update the status information to the ASM server 301 based on a threshold value corresponding to each of the one or more parameters associated with the VAL server 302. At step 2, the VAL server 302 transmits monitoring information report to the ASM server 301. The VAL server 302 transmits the status information of the VAL server 302 to the ASM server 301 in the monitoring information report.

For example, when the VAL server 302 reaches resource threshold or overload conditions, which may lead to non-availability of the services to the VAL client, the VAL server 302 pushes status information of the VAL server 302 to the ASM server 301. Similarly, when the VAL server 302 is configured to provide the status information for example say for every two hours, the VAL server 302 automatically pushes status information of the VAL server 302 every two hours to the ASM server 301. The ASM server 301 receives the status information from the VAL server 302 based on the threshold value corresponding to each of the one or more parameters associated with the VAL server 302. Upon receiving, at step 3, the ASM server 301 transmits the monitoring information report response to the VAL server 302. The VAL server 302 receives the monitoring information report response from the ASM server 301. Further, at step 4, the ASM server 301 provides the status information of the VAL server 302 to the one or more entities to perform the one or more actions.

FIG. 3C illustrates a sequence diagram for obtaining status information of a VAL server using subscribe-notify procedure in accordance with some embodiments of present disclosure. At step 1, the ASM server 301 decides to subscribe status of the VAL server 302 based on configuration or request from other entity. The ASM server 301 decides to transmit a subscribe request to the VAL server 302 to obtain the status information of the VAL server 302. The subscribe request comprises one or more events related to the VAL server 302. The one or more events may include, but is not limited to, obtaining the status information for a predefined time, obtaining the status information when the request queue length exceeds the threshold value, and the like.

At step 2, the ASM server 301 transmits the subscribe request to the VAL server 302. The VAL server 302 receives the subscribe request from the ASM server 301 to provide the status information. At step 3, the VAL server 302 transmits a subscribe response to the ASM server 301. The ASM server 301 receives the subscribe response. The subscribe response comprises either a success or failure of the subscribe request. At step 4, the VAL server 302 transmits a notification of occurrence of the one or more events and the status information of the VAL server 302 based on the occurrence of the one or more events to the ASM server 301, after transmitting the successful subscription of the subscribe request.

The ASM server 301 receives the notification of occurrence of the one or more events and the status information of the VAL server 302 based on the occurrence of the one or more events. For example, if the VAL server 302 is configured to provide the status information for every one hour, the ASM server 301 receives the notification and the status information after every one hour. Upon receiving, at step 5, the ASM server 301 provides the status information of the VAL server 302 to the one or more entities to perform the one or more actions.

The one or more modules 112 may also include other modules 203 to perform various miscellaneous functionalities of the ASM server 105. It will be appreciated that such modules may be represented as a single module or a combination of different modules.

Figure 2B:
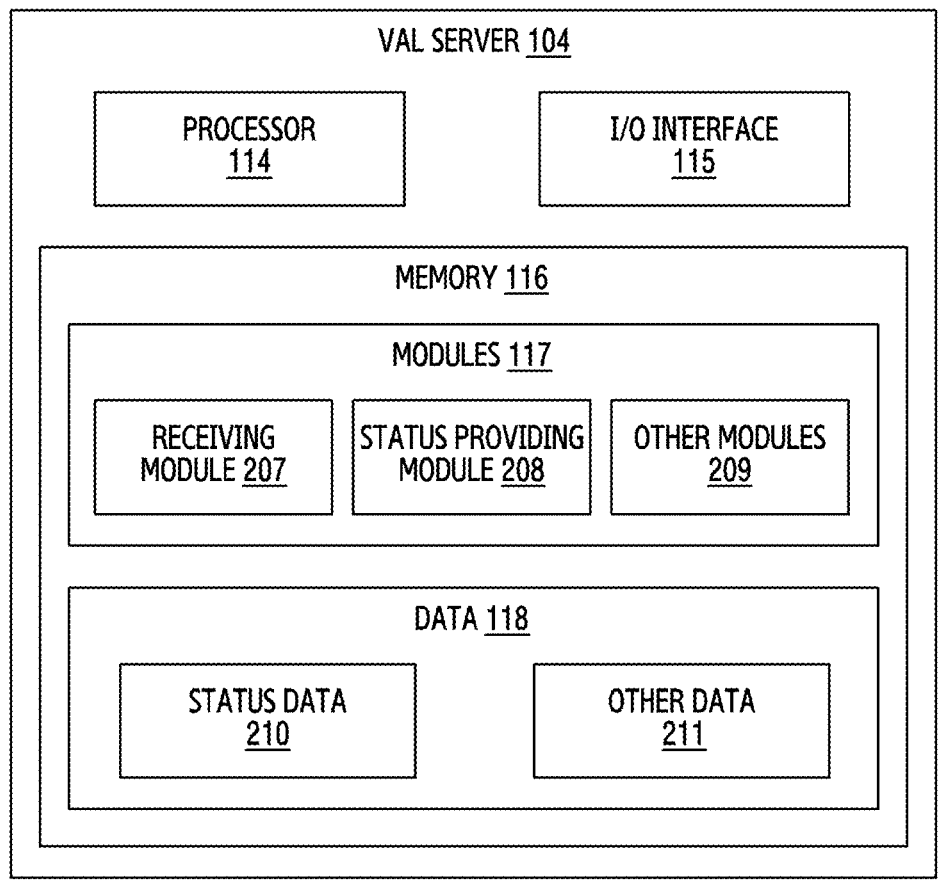
FIG. 2B illustrates a detailed block diagram of a VAL server for monitoring application services in a network in accordance with some embodiments of the present disclosure.

FIG. 2B shows a detailed block diagram of a VAL server for monitoring application services in a network in accordance with some embodiments of the present disclosure.

Data 118 and the one or more modules 117 in the memory 116 of the VAL server 104 is described herein in detail.

In one example, the one or more modules 117 may include, but are not limited to, a receiving module 207, a status providing module 208 and one or more other modules 209, associated with the VAL server 104.

In an embodiment, the data 118 in the memory 116 may include status data 210 and other data 211 associated with the VAL server 104.

The status data 210 comprises the status information of the VAL server 104. The status information includes, but not limited to, average request queue length, average processing time, CPU usage, memory usage, VAL server traffic, congestion status, average server response time, VAL server uptime, VAL server availability status, throughput level, and congestion status.

The other data 211 may store data, including temporary data and temporary files, generated by modules for performing the various functions of the VAL server 104.

In an embodiment, the data 118 in the memory 116 may be processed by the one or more modules 117 of the VAL server 104. In an embodiment, the one or more modules 117 may be implemented as dedicated units and when implemented in such a manner, said modules may be configured with the functionality defined in the present disclosure to result in a novel hardware. As used herein, the term module may refer to an application specific integrated circuit (ASIC), an electronic circuit, a field-programmable gate arrays (FPGA), programmable system-on-chip (PSoC), a combinational logic circuit, and/or other suitable components that provide the described functionality.

One or more modules 117 of the VAL server 104 along with the data 118 functions to monitor application services in the network using the VAL server 104.

The receiving module 207 may receive the configuration request from the ASM server 105. The configuration request comprises the one or more parameters associated with the VAL server 104. Upon receiving, the status providing module 208 may provide the status information of the VAL server 104 to the ASM server 105 for monitoring the application services provided by the VAL server 104 based on the one or more parameters. The monitoring is performed using either the pull procedure, the push procedure, and the subscribe-notify procedure. In an embodiment, the status information of the VAL server 104 may be provided by the ASM client 106 configured on the VAL server 104 to the ASM server 105 by performing either the pull procedure, the push procedure, and the subscribe-notify procedure.

The one or more modules 117 may also include other modules 209 to perform various miscellaneous functionalities of the VAL server 104. It will be appreciated that such modules may be represented as a single module or a combination of different modules.

Figure 4:
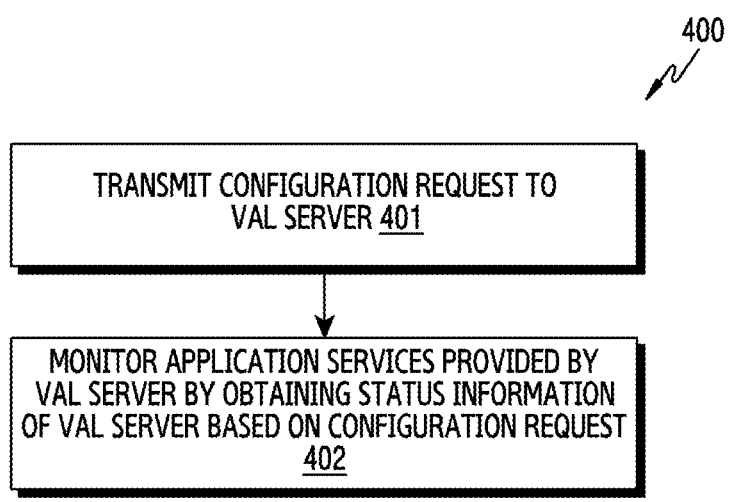
FIG. 4 illustrate a flow diagram showing exemplary method for monitoring application services in a network using an ASM server in accordance with some embodiments of present disclosure.

FIG. 4 illustrate a flow diagram showing exemplary methods for monitoring application services in a network using an ASM server in accordance with some embodiments of present disclosure.

As illustrated in FIG. 4, the method 400 may include one or more blocks for executing processes in the ASM server 105. The method 400 may be described in the general context of computer executable instructions. Generally, computer executable instructions can include routines, programs, objects, components, data structures, procedures, modules, and functions, which perform particular functions or implement particular abstract data types.

The order in which the method 400 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, transmitting, by the transmission module 201, the configuration request to the VAL server 104. The configuration request includes the one or more parameters associated with the VAL server 104. The one or more parameters may include, but not limited to, slice type, QoS of the VAL server, list of VAL users with subscription status, priority of the VAL users, throttle percentage for the VAL server response time, VAL server uptime, VAL server availability status, throughput level, and congestion status.

At block 402, monitoring, by the monitoring module 202, application services provided by the VAL server 104 by obtaining status information of the VAL server 104 based on the one or more parameters. The monitoring of the application services is performed by using either the pull procedure, the push procedure, or the subscribe-notify procedure.

Particularly, in the pull procedure, the ASM server 105 transmits status request to the VAL server 104 to obtain the status information of the VAL server 104 based on either the configuration or the request from the one or more entities. Upon transmitting, the ASM server 105 receives the status information of the VAL server 104 in response to the status request and provides the status information to the one or more entities to perform the one or more actions. In the push procedure, the ASM server 105 receives the status information from the VAL server 104 based on the threshold value of the one or more parameters associated with the VAL server 104. Upon receiving the status information, the ASM server 105 transmits acknowledgment response to the VAL server 104 and provides the status information of the VAL server 104 to the one or more entities to perform the one or more actions.

In the subscribe-notify procedure, the ASM server 105 transmits subscribe request to the VAL server 104 to obtain the status information of the VAL server 104. The subscribe request comprises the one or more events related to the VAL server 104. Upon transmitting, the ASM server 105 receives subscribe response comprising either success or failure of the subscribe request. Upon receiving successful subscription, the ASM server 105 receives notification of occurrence of the one or more events and the status information of the VAL server 104 based on the occurrence of the one or more events. Upon receiving, the ASM server 105 provides the status information of the VAL server 104 to the one or more entities to perform the one or more actions.

Figure 5:
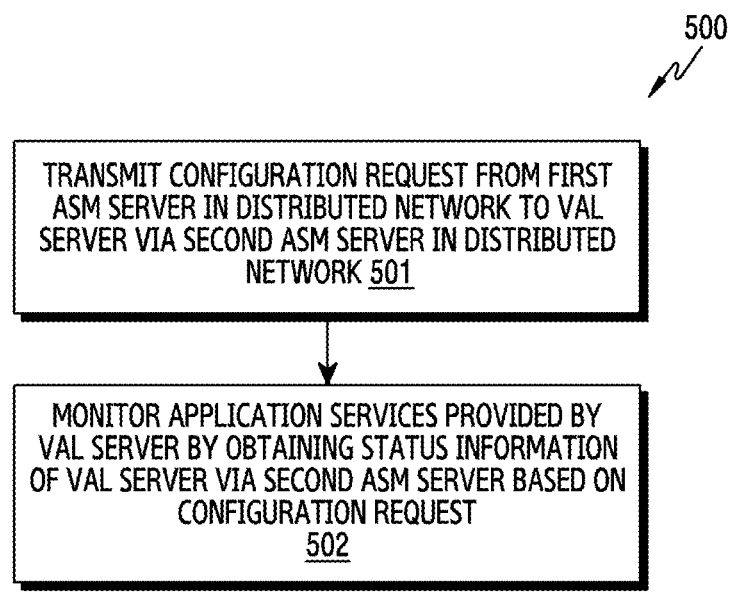
FIG. 5 illustrates a flow diagram showing exemplary method for monitoring application services in a distributed network in accordance with some embodiments of present disclosure.

FIG. 5 illustrate a flow diagram showing exemplary methods for monitoring application services in a distributed network in accordance with some embodiments of present disclosure.

As illustrated in FIG. 5, the method 500 may include one or more blocks for executing processes in the ASM server 105. The method 500 may be described in the general context of computer executable instructions. Generally, computer executable instructions can include routines, programs, objects, components, data structures, procedures, modules, and functions, which perform particular functions or implement particular abstract data types.

The order in which the method 500 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, transmitting, by the transmitting module 201, the configuration request from the first ASM server 303 to the VAL server 305 via the second ASM server 304. The configuration request includes the one or more parameters associated with the VAL server 305. The one or more parameters may include, but not limited to, the slice type, the QoS of the VAL server, the list of VAL users with subscription status, priority of the VAL users, throttle percentage for the VAL server response time, the VAL server uptime, the VAL server availability status, the throughput level, and the congestion status.

At block 502, monitoring, by the monitoring module 202, the application services provided by the VAL server 305 by obtaining the status information of the VAL server 305 via the second ASM server 304. The second ASM server 304 obtains the status information from the VAL server 305 based on the one or more parameters. The monitoring of the application services is performed by using either the pull procedure, the push procedure, or the subscribe-notify procedure.

Figure 6:
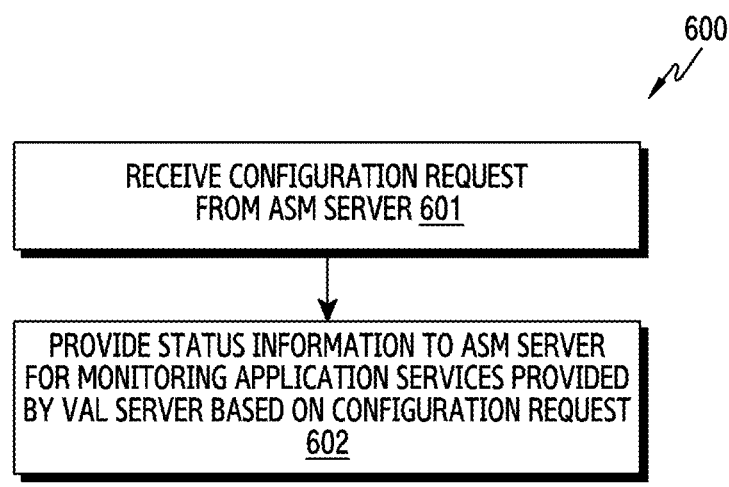
FIG. 6 illustrates a flow diagram showing exemplary method for monitoring application services in a network via VAL server in accordance with some embodiments of present disclosure.

FIG. 6 illustrate a flow diagram showing exemplary methods for monitoring application services in a network via a VAL server in accordance with some embodiments of present disclosure.

As illustrated in FIG. 6, the method 600 may include one or more blocks for executing processes in the VAL server 104. The method 600 may be described in the general context of computer executable instructions. Generally, computer executable instructions can include routines, programs, objects, components, data structures, procedures, modules, and functions, which perform particular functions or implement particular abstract data types.

The order in which the method 600 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 601, receiving, by the receiving module 207, the configuration request from the ASM server 105. The configuration request includes the one or more parameters associated with the VAL server 104. The one or more parameters may include, but not limited to, the slice type, the QoS of the VAL server, the list of VAL users with subscription status, priority of the VAL users, throttle percentage for the VAL server response time, the VAL server uptime, the VAL server availability status, the throughput level, and the congestion status.

At block 602, providing, by the status providing module 208, the status information to the ASM server 105 for monitoring the application services provided by the VAL server 104 based on the one or more parameters. The status information of the VAL server 104 includes, but not limited to, the average request queue length, the average processing time, the CPU usage, the memory usage, the VAL server traffic, the congestion status, the average server response time, the VAL server uptime, the VAL server availability status, the throughput level, and the congestion status. The monitoring of the application services is performed by using either the pull procedure, the push procedure, or the subscribe-notify procedure.

Computing System

Figure 7:
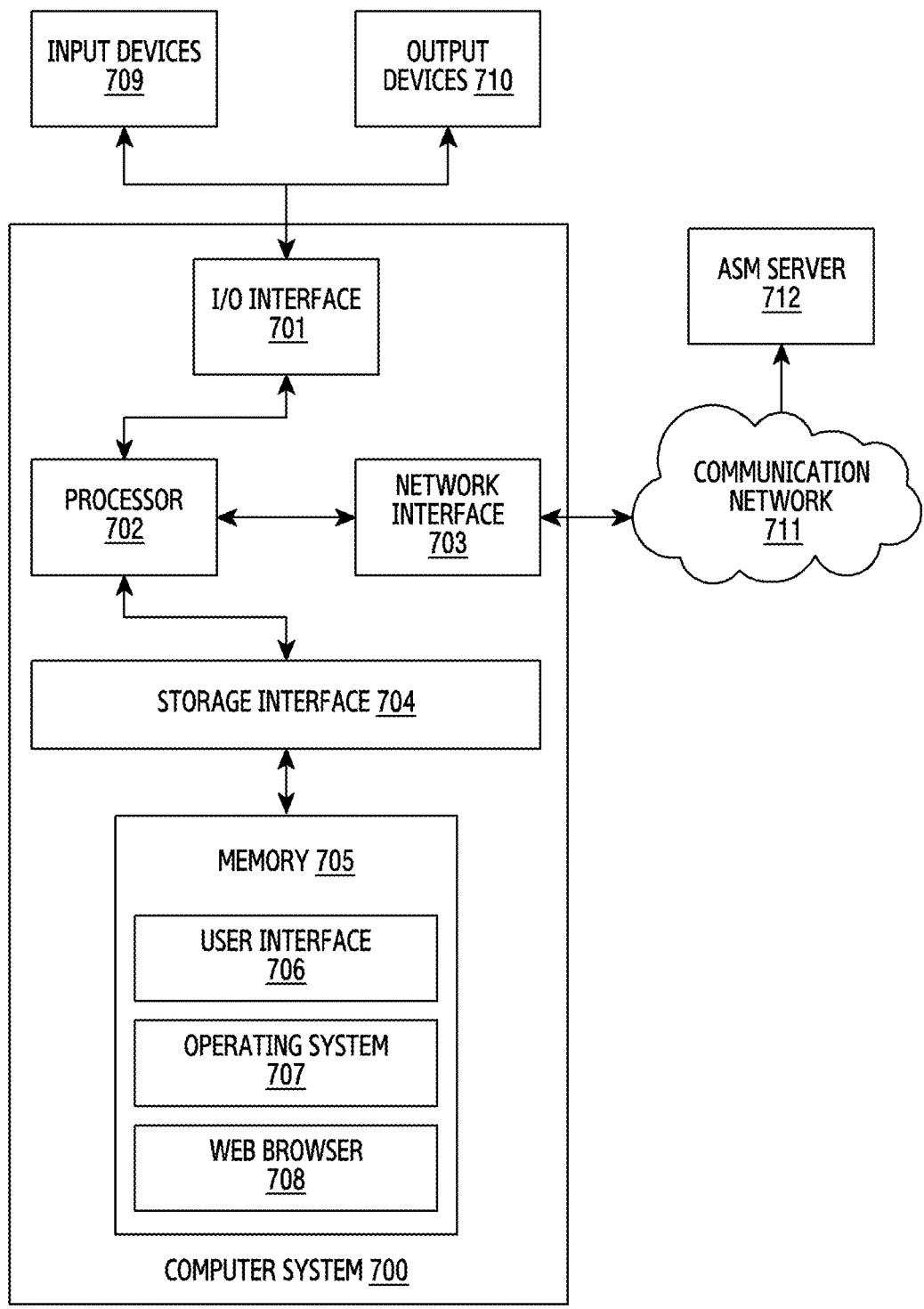
FIG. 7 illustrates a block diagram of an exemplary computer system in accordance with some embodiments of the present disclosure.

FIG. 7 illustrates a block diagram of an exemplary computer system 700 according to various embodiments of the present disclosure. In an embodiment, the computer system 700 is used to implement the ASM server 105 for monitoring the application services in the network. In an embodiment, the computer system 700 may be used to implement the VAL server 104 for monitoring the application services in the network. The computer system 700 may include a central processing unit ("CPU" or "processor") 702. The processor 702 may include at least one data processor for executing processes in Virtual Storage Area Network. The processor 702 may include specialized processing units such as, integrated system (bus) controllers, memory management control units, floating point units, graphics processing units, digital signal processing units, etc.

The processor 702 may be disposed in communication with one or more input/output (I/O) devices 709 and 710 via I/O interface 701. The I/O interface 701 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices 709 and 710. For example, the input devices 709 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 710 may be a printer, fax machine, video display (e.g., cathode ray tube (CRT), liquid crystal display (LCD), light-emitting diode (LED), plasma, plasma display panel (PDP), organic light-emitting diode display (OLED) or the like), audio speaker, etc.

The processor 702 may be disposed in communication with the communication network 711 via a network interface 703. The network interface 703 may communicate with the communication network 711. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 711 may include, without limitation, a direct interconnection, local area network (LAN), wide area network (WAN), wireless network (e.g., using Wireless Application Protocol), the Internet, etc. Using the network interface 803 and the communication network 711, the computer system 700 may monitor the application services in the network. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 711 includes, but is not limited to, a direct interconnection, an e-commerce network, a peer to peer (P2P) network, local area network (LAN), wide area network (WAN), wireless network (e.g., using wireless application protocol), the Internet, Wi-Fi, and such. The first network and the second network may either be a dedicated network or a shared network, which represents an association of the different types of networks that use a variety of protocols, for example, hypertext transfer protocol (HTTP), transmission control protocol/internet protocol (TCP/IP), wireless application protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in FIG. 7) via a storage interface 704. The storage interface 804 may connect to memory 705 including, without limitation, memory drives, removable disc drives, etc., employing connection protocols such as, serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 705 may store a collection of program or database components, including, without limitation, user interface 706, an operating system 707 etc. In some embodiments, computer system 700 may store user/application data 706, such as, the data, variables, records, etc., as described in this disclosure. Such databases may be implemented as fault-tolerant, relational, scalable, secure databases such as Oracle ® or Sybase®.

The operating system 707 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, etc.), APPLE® IOS™, GOOGLE® ANDROID™, BLACKBERRY® OS, or the like.

In some embodiments, the computer system 700 may implement a web browser 708 stored program component. The web browser 708 may be a hypertext viewing application, such as Microsoft Internet Explorer, Google Chrome, Mozilla Firefox, Apple Safari, etc. Secure web browsing may be provided using hypertext transport protocol secure (HTTPS), secure sockets layer (SSL), transport layer security (TLS), etc. Web browsers 708 may utilize facilities such as AJAX, DHTML, Adobe Flash, JavaScript, Java, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP, ActiveX, ANSI C++/C#, Microsoft .NET, common gateway interface (CGI) scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 700 may implement a mail client stored program component. The mail client may be a mail viewing application, such as Apple Mail, Microsoft Entourage, Microsoft Outlook, Mozilla Thunderbird, etc.

Figure 8:
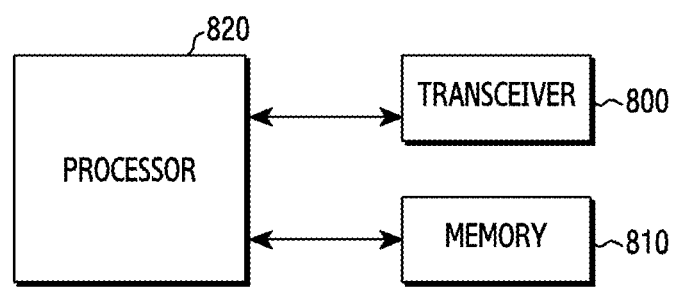
FIG. 8 illustrates a structure of a UE according to an embodiment of the disclosure.

FIG. 8 illustrates a structure of a UE according to an embodiment of the disclosure.

As shown in FIG. 8, the UE according to an embodiment may include a transceiver 810, a memory 820, and a processor 830. The transceiver 810, the memory 820, and the processor 830 of the UE may operate according to a communication method of the UE described above. However, the components of the UE are not limited thereto. For example, the UE may include more or fewer components than those described above. In addition, the processor 830, the transceiver 810, and the memory 820 may be implemented as a single chip. Also, the processor 830 may include at least one processor. Furthermore, the UE of FIG. 8 corresponds to the UE of the FIG. 1.

The transceiver 810 collectively refers to a UE receiver and a UE transmitter, and may transmit/receive a signal to/from a base station or a network entity. The signal transmitted or received to or from the base station or a network entity may include control information and data. The transceiver 810 may include a RF transmitter for up-converting and amplifying a frequency of a transmitted signal, and a RF receiver for amplifying low-noise and down-converting a frequency of a received signal. However, this is only an example of the transceiver 810 and components of the transceiver 810 are not limited to the RF transmitter and the RF receiver.

Also, the transceiver 810 may receive and output, to the processor 830, a signal through a wireless channel, and transmit a signal output from the processor 830 through the wireless channel.

The memory 820 may store a program and data required for operations of the UE. Also, the memory 820 may store control information or data included in a signal obtained by the UE. The memory 820 may be a storage medium, such as read-only memory (ROM), random access memory (RAM), a hard disk, a CD-ROM, and a DVD, or a combination of storage media.

The processor 830 may control a series of processes such that the UE operates as described above. For example, the transceiver 810 may receive a data signal including a control signal transmitted by the base station or the network entity, and the processor 830 may determine a result of receiving the control signal and the data signal transmitted by the base station or the network entity.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

An embodiment of the present disclosure provisions a method for monitoring application services in a network by performing either pull, push and subscribe-notify procedure. Thus, ensuring service availability to user related to the applications.

An embodiment of the present disclosure enables the network to monitor application service status and adjust UE communication patterns and network resources accordingly.

An embodiment of the present disclosure allows the network to mitigate any service failure conditions.

An embodiment of the present disclosure provides significant reduction in cost incurred due to service failures and enhances the service experience of the user.

An embodiment of the present disclosure provides dynamic life cycle management of the application services by predicting unavailability of application services.

An embodiment of the present disclosure improves accuracy of prediction of unavailability of application services and required corrective actions by interacting with service enabler architecture layer (SEAL) services.

The described operations may be implemented as a method, system or article of manufacture using standard programming and/or engineering techniques to produce software, firmware, hardware, or any combination thereof. The described operations may be implemented as code maintained in a "non-transitory computer readable medium," where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, programmable gate array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the present disclosure, and that the article of manufacture may include suitable information bearing medium known in the art.

The terms "an embodiment," "embodiment," "embodiments," "the embodiment," "the embodiments," "one or more embodiments," "some embodiments," and "one embodiment" mean "one or more (but not all) embodiments of the present disclosure" unless expressly specified otherwise.

The terms "including," "comprising," "having" and variations thereof mean "including but not limited to," unless expressly specified otherwise.

The enumerated listing of items does not imply that any or all of the items are mutually exclusive, unless expressly specified otherwise.

The terms "a," "an" and "the" mean "one or more," unless expressly specified otherwise.

A description of an embodiment with several components in communication with each other does not imply that all such components are required. On the contrary a variety of optional components are described to illustrate the wide variety of possible embodiments of the present disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present disclosure need not include the device itself.

The illustrated operations of FIGS. 4, 5 and 6 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the present disclosure be limited not by this detailed description, but rather by any claims that issue on an application based here on. Accordingly, the disclosure of the embodiments of the present disclosure is intended to be illustrative, but not limiting, of the scope of the present disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Although the present disclosure has been described with various embodiments, various changes and modifications may be suggested to one skilled in the art. It is intended that the present disclosure encompass such changes and modifications as fall within the scope of the appended claims.

REFERRAL NUMERALS

| Reference Number | Description |
| --- | --- |
| 100 | System |
| 101 | User Equipment |
| 102 | VAL client |
| 103 | ASM client |
| 104 | VAL server |
| 105 | ASM server |
| 106 | ASM client |
| 107 | VAL user database |
| 108 | Network |
| 109, 114 | Processor |
| 110, 115 | I/O interface |
| 111, 116 | Memory |
| 112, 117 | Modules |
| 113, 118 | Data |
| 201 | Transmission Module |
| 202 | Monitoring Module |
| 203 | Other Modules |
| 204 | Configuration Data |
| 205 | VAL server Data |
| 206 | Other Data |
| 207 | Receiving Module |
| 208 | Status providing Module |
| 209 | Other Modules |
| 210 | Status Data |
| 211 | Other Data |
| 301 | ASM server |
| 302 | VAL server |
| 303 | First ASM server |
| 304 | Second ASM server |
| 305 | VAL server |
| 700 | Computer System |
| 701 | I/O Interface |
| 702 | Processor |
| 703 | Network Interface |
| 704 | Storage Interface |
| 705 | Memory |
| 706 | User Interface |
| 707 | Operating System |
| 708 | Web Browser |
| 709 | Input Devices |
| 710 | Output Devices |
| 711 | Communication Network |
| 712 | ASM server |

What is claimed is:

1. A method performed by an application service management (ASM) server in a communication system, the method comprising:
   receiving, from a first network entity, a first request message associated with status information;
   transmitting, to a vertical application layer (VAL) server, a second request message associated with the status information;
   receiving, from the VAL server, a first response message including a first report associated with the status information; and
   upon receiving the first report, updating a first monitoring, status information of the VAL server.

2. The method of claim 1
wherein the updating comprises updating the first monitoring status of the VAL server to a VAL user equipment (UE), a VAL client, or a 3rd generation partnership project (3GPP) network entity, and
wherein the first network entity includes a VAL service provider.

3. The method of claim 1, further comprising:
identifying to request the status information periodically.

4. The method of claim 1, further comprising:
receiving, from a second network entity, a third request message associated with a monitoring information subscribe request
transmitting, to the VAL server, fourth request message associated with the monitoring information subscribe request; and
receiving, from the VAL server, a second response message associated with the monitoring information subscribe request, the second response message including a success or a failure associated with the fourth request message.

5. The method of claim 4,
wherein the fourth request message includes event information and an event is identified based on the event information by the VAL server.

6. The method of claim 5, further comprising:
receiving, from the VAL server, a notification message including a second report associated with monitoring information; and
upon receiving the second report, updating a second monitoring status of the VAL server.

7. A method performed by a vertical application layer (VAL) server in a communication system, the method comprising:
receiving, from an application service management (ASM) server, a configuration first request message associated with status information; and
transmitting, to the ASM server, a first response message including a first report associated with the status information,
wherein the first report is associated with updating a first monitoring status of the VAL server.

8. The method of claim 7,
wherein the updating associated with updating the first monitoring status of the VAL server to a VAL user equipment (UE), a VAL client, or a 3rd generation partnership project (3GPP) network entity.

9. The method of claim 7, further comprising:
receiving, from the ASM server, the status information periodically.

10. The method of claim 7, further comprising:
receiving, from the ASM server, a second request message associated with a monitoring information subscribe request; and
transmitting, to the ASM server, a second response message associated with the monitoring information subscribe request, the second response message including a success or a failure associated with the second request message.

11. An application service management (ASM) server in a communication system, the ASM server comprising:
a transceiver; and
at least one processor coupled with the transceiver and configured to:
receive, from a first network entity, a first request message associated with status information,
transmit, to a vertical application layer (VAL) server, a second request message associated with the status information,
receive, from the VAL server a first response message including a first report associated with the status information, and
upon receiving the first report, update a first monitoring status of the VAL server.

12. The ASM server of claim 11,
wherein the updating comprises updating the first monitoring status of the VAL server to a VAL user equipment (UE), a VAL client, or a 3rd generation partnership project (3GPP) network entity, and
wherein the first network entity includes a VAL service provider.

13. The ASM server of claim 11, wherein the at least one processor is further configured to: identify to request the status information periodically.

14. The ASM server of claim 11, wherein the at least one processor is further configured to:
receive, from a second network entity, a third request message associated with a monitoring information subscribe request,
transmit, to the VAL server, a fourth request message associated with the monitoring information subscribe request, wherein the fourth request message includes event information and an event is identified based on the event information by the VAL server,
receive, from the VAL server, a second response message associated with the monitoring information subscribe request, the second response message including a success or a failure associated with the fourth request message,
receive, from the VAL server, a notification of occurrence message including a second report associated with monitoring information, and
upon receiving the second report, update a second monitoring status of the VAL server.

15. The method of claim 10,
wherein the second request message includes event information and an event is identified based on the event information by the VAL server.

16. The method of claim 15, further comprising:
transmitting, to the ASM server, a notification message including a second report associated with monitoring information,
wherein the second report is associated with updating a second monitoring status of the VAL server.

17. A vertical application layer (VAL) server in a communication system, the VAL server comprising:
a transceiver; and
at least one processor coupled with the transceiver and configured to:
receive, from an application service management (ASM) server, a first request message associated with status information; and
transmit, to the ASM server, a first response message including a first report associated with the status information,
wherein the first report is associated with updating a first monitoring status of the VAL server.

18. The VAL server of claim 17,
wherein the updating associated with updating the first monitoring status of the VAL server to a VAL user equipment (UE), a VAL client, or a 3rd generation partnership project (3GPP) network entity.

19. The VAL server of claim 17, wherein the at least one processor is further configured to:
  receive, from the ASM server, the status information periodically.

20. The VAL server of claim 17, wherein the at least one processor is further configured to:
  receive, from the ASM server, a second request message associated with a monitoring information subscribe request, wherein the second request message includes event information and an event is identified based on the event information by the VAL server,
  transmit, to the ASM server, a second response message associated with the monitoring information subscribe request, the second response message including a success or a failure associated with the second request message, and
  transmitting, to the ASM server, a notification message including a second report associated with monitoring information,
  wherein the second report is associated with updating a second monitoring status of the VAL server.

\* \* \* \* \*